(12) United States Patent
Chatsinchai et al.

(10) Patent No.: US 7,437,715 B2
(45) Date of Patent: Oct. 14, 2008

(54) SYSTEM AND METHOD FOR GENERATING A SET OF ROBOT COMMANDS BASED ON USER ENTRY EVENTS IN A USER INTERFACE

(75) Inventors: Kit Chatsinchai, San Jose, CA (US); Bino George, San Jose, CA (US); Kishan Thomas, Sunnyvale, CA (US); Kui Gong, Campbell, CA (US); Brian M. Buesker, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1182 days.

(21) Appl. No.: 10/119,618

(22) Filed: Apr. 9, 2002

(65) Prior Publication Data
US 2003/0191559 A1 Oct. 9, 2003

(51) Int. Cl.
*G06F 9/44* (2006.01)
(52) U.S. Cl. ............... 717/127; 717/106; 717/114; 717/134; 715/704
(58) Field of Classification Search ......... 717/106–109, 717/114–118, 127, 134; 715/704
See application file for complete search history.

(56) References Cited

U.S. PATENT DOCUMENTS 6,101,524 A * 8/2000 Choi et al. ................. 718/102
6,184,880 B1 * 2/2001 Okada ....................... 715/704
6,189,047 B1 * 2/2001 Ball .......................... 719/318
6,789,254 B2 * 9/2004 Broussard .................. 717/147

OTHER PUBLICATIONS

Steven, Chandra, Fleck, Podgurski "jRapture: A Capture/Replay Tool for Observation-Based Testing",Aug. 2000, ACM SIGSOFT, v25 i5, pp. 158-167.*
Ronsse, Bosschere "RecPlay: A Fully Integrated Practical Record/Replay System", May 1999 ACM TOCS, v17 i2, pp. 133-152.*
Steven, Chandra, Fleck, Podgurski "jRapture: A Capture/Replay Tool for Obselation-Based Testing"18/2000, ACM SIGSOFT, v 25 i5, pp. 158-167.*
Ronsse, Bosschere "Recplay: A Fully Integrated Practical Record/Replay System", May 1999 ACM TOCS, v17 i2, pp. 133-152.*
"Jav a 2 Platform SE v1.2:Class Robot", Aug. 2000, http://java.sun.com/j2se/1.3/docs/api/java/awt/robot.html.*
"Americaqn heritage College Dictionary" 2002, 4th edition, p. 544.*
"Microsoft Computer Dictionary" 2002, 5th edition, p. 323.*

* cited by examiner

*Primary Examiner*—Lewis A. Bullock, Jr.
*Assistant Examiner*—Jason Mitchell (57) ABSTRACT

A system for generating a set of robot commands uses user entry events in a user interface. Such a system may include an event queue to which the events are sent from the user interface and a RobotCreator tool for receiving the events as those events are submitted to the event queue. The event queue is configured to allow receipt of the events by the RobotCreator. The RobotCreator tool converts the events into robot commands.

25 Claims, 6 Drawing Sheets

Fig. 4

SYSTEM AND METHOD FOR GENERATING A SET OF ROBOT COMMANDS BASED ON USER ENTRY EVENTS IN A USER INTERFACE A System and Method for Generating a Set of Robot Commands Based on User Entry Events in a User Interface

BACKGROUND

In some conventional computer application programs, users had the ability to create macros. Macros were subroutines that, when executed, performed a predetermined set of commands within the application program. For example, in a word processing application, a macro may, when executed, set up a particular format for a document including inserting some boilerplate language and fields for the entry of document-specific text. In a spreadsheet application, a macro may have, when executed, set up a particular spreadsheet format with appropriate formulae, etc.

The creation of a macro tended to be specific to the application in which the macro was to be used. In general, it was difficult or impossible to use a macro prepared for one application in another application. The creation of a macro may have required the user to know an appropriate language in which the macro commands could be written in a macro editor within the application program. Alternatively, some applications allowed the user to simply perform the commands that were to be incorporated in the macro while recording those actions for automatic incorporation in a macro. In the current computer environment, the use of macros, as they were traditionally known, has gradually diminished into complete obscurity.

However, in Java Development Kit (JDK) 1.3 for the JAVA language, a class was added known as java.awt.Robot. This class contains commands, known as robot commands, that correspond to particular user entries, such as keystrokes on a keyboard, movement of a mouse, etc.

Using the robot commands, an application developer can theoretically write commands into an application that will substitute for user input through a user interface. However, manually writing and inserting such robot commands into an existing JAVA application or applet is a non-trivial task. Such manual preparation of robot commands requires an intimate knowledge of the JAVA application and the robot command sets, as well as the intrinsic ability to visualize the behavior and appearance of the graphical user interface of the application in which the robot commands will operate.

Thus, making use of robot commands is currently very difficult for even seasoned JAVA programmers and entirely beyond the purview of a mere application user. Unfortunately, it is the application's end-user that is most likely to have the need for generating a robot command set to customize operation of the application for his or her own particular needs.

SUMMARY

The present specification describes, among other things, a system for generating a set of robot commands based on user entry events in a user interface. Such a system may include an event queue to which the events are sent from the user interface and a RobotCreator tool for receiving the events as those events are submitted to the event queue. The event queue is configured to allow receipt of the events by the RobotCreator. The RobotCreator tool converts the events into robot commands.

The present specification also describes a method of generating a set of robot commands based on user entry events in a user interface by intercepting the events as those events are submitted to the event queue and converting the events into robot commands.

The present specification also describes a software tool, stored on a medium for storing software. The tool, when executed, causes generation of a set of robot commands based on user entry events in a user interface by receiving the events as those events are submitted to the event queue; and converting the events into robot commands.

BRIEF DESCRIPTION OF THE DRAWINGS

The accompanying drawings illustrate preferred embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION

The present specification describes, in one embodiment, a modification to the event queue of an application, particularly a JAVA application, so that user commands or data entered through a user interface, can be recorded and processed automatically into a set of robot commands. Consequently, anyone who can operate the user interface can readily and efficiently create a set of robot commands for use within the application or by another application.

Figure 1A:
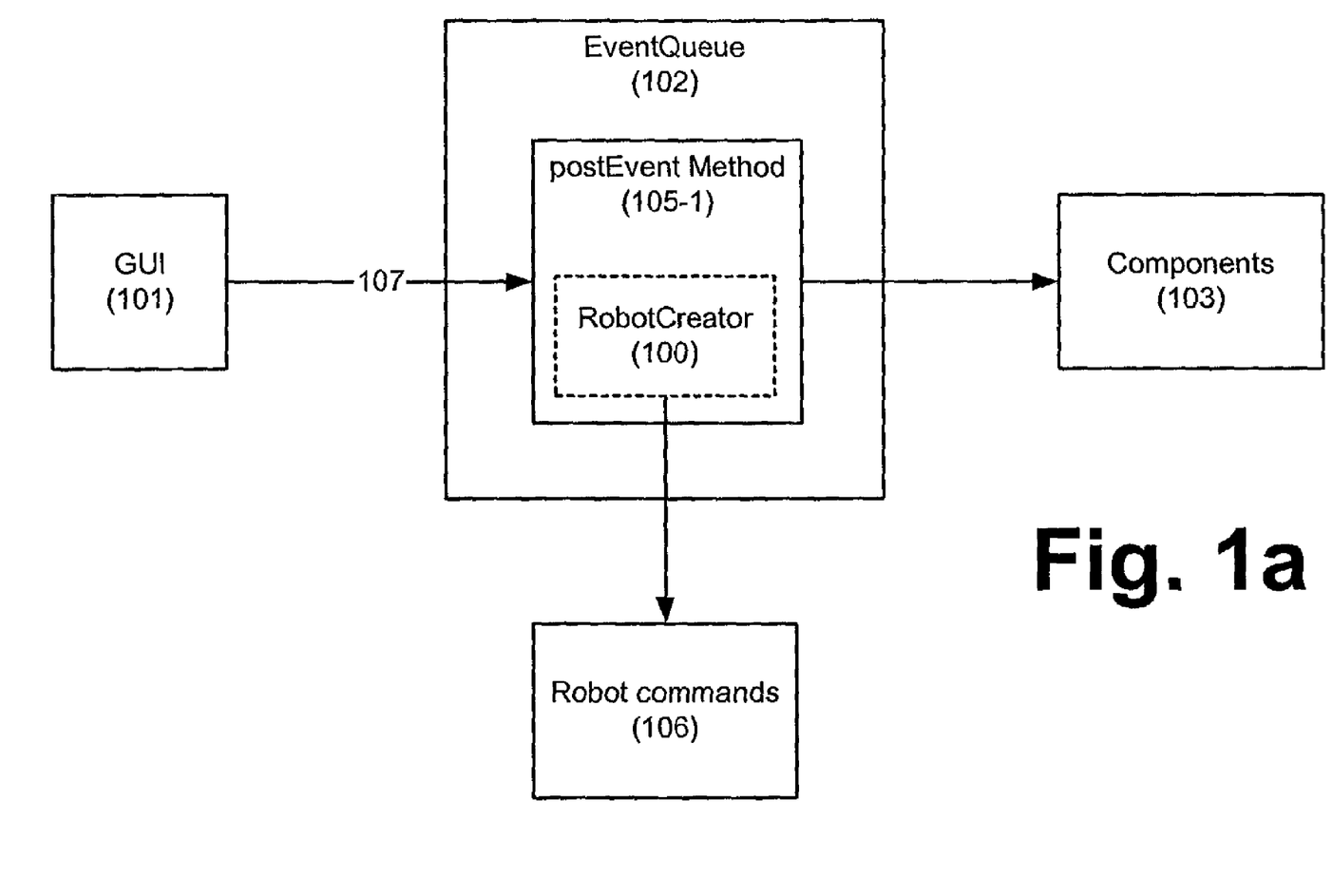
FIG. 1a is a block diagram illustrating the principal components of one embodiment according to principles of the present invention in which user input to a graphical user interface is captured for automatic creation of a robot command set.

As shown in FIG. 1a, an embodiment of the present invention has a user interface (101). Preferably this is a graphical user interface (GUI) (101). GUIs are common in most current computer applications. As used herein, and in the appended claims, a GUI (101) is an application or a software component of a computer application through which a user enters input. The GUI (101) will receive user input from, for example, a keyboard or a mouse, and interpret that input as data and commands being submitted to the application. The GUI (101) may also echo the data that is input, or may display a result following execution of an input command by the underlying application. Under the principles of the present invention, the GUI (101) is preferably a JAVA GUI.

As used herein, and in the appended claims, user input may be generally referred to as an "event." In the preferred JAVA environment, there may be key events that result from a user operating the system's keyboard, mouse events that result from a user operating the system's mouse and window events that result from the user's operation of the operating system, e.g. Windows® by Microsoft.

Referring to FIG. 1a, when events are entered through the GUI (101), those events (107) are transferred to an event queue (102). From the event queue (102), the events (107) are transferred to appropriate components (103) of the application or operating system for execution. Execution may be, for example, the execution of an input command or merely echoing the input within the GUI (101).

Under principles of the present invention, the event queue (102) is configured or modified to allow the events (107) to be intercepted. More specifically, a postEvent Method (105-1) that exists in the java.awt.EventQueue class is modified to intercept events (107) for translation into robot commands (106). This will all be described in more detail below.

The event queue (102) is modified by altering the Java Runtime Environment (JRE) source files that contain the java.awt.EventQueue class, including the postEvent method. Such modification will be within the ambit of one skilled in the art with the benefit of this disclosure.

With these modifications, a RobotCreator tool (100) is incorporated into the postEvent method. The RobotCreator tool (100) receives events (107) as they are sent to the postEvent method (105-1) of the event queue (102). The RobotCreator tool (100) is a tool that, upon receipt of an event (107), translates that event into a robot command using the appropriate language and syntax. A series of events are translated into a robot command set (106). In other words, Robot-Creater (100) is a tool that will generate the sequence of robot commands necessary to recreate the mouse movements, mouse clicks, key presses and other events (i.e., the events (107)) entered into a GUI (101) and sent to the postEvent method (105-1) of the event queue (102).

Consequently, the user can, by operating the GUI (101) and using the modified postEvent method component (105-1) quickly create a robot command set (106) without any knowledge other than how to operate the GUI (101). The user need not know the language and syntax of the robot command class.

Figure 1B:
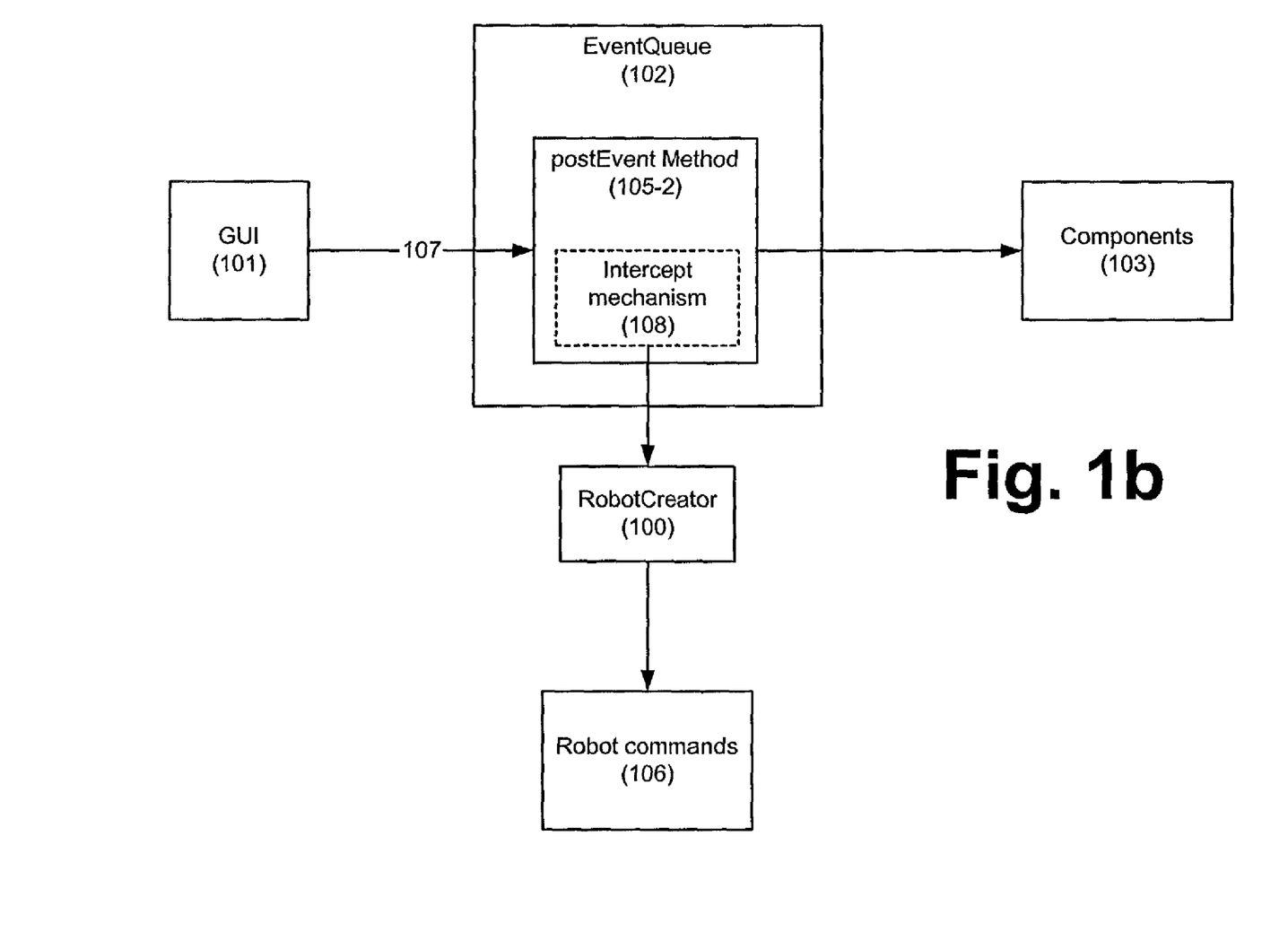
FIG. 1b is a block diagram illustrating the principal components of an alternative embodiment according to principles of the present invention in which user input to a graphical user interface is captured for automatic creation of a robot command set.

FIG. 1b illustrates another possible embodiment of the present invention. As shown in FIG. 1b, the postEvent method is modified, not to include a RobotCreator, but simply with an intercept mechanism (108). The intercept mechanism (108) will intercept events as they are sent to the postEvent method (105-2). The intercept mechanism (108) then additionally sends the events to a RobotCreator (100) that is external to the postEvent Method (105-2).

The RobotCreator (100), upon receipt of the events, again generates a set of robot commands (106). Thus, again, the user can operate the GUI (101) and make use of the modified postEvent method component (105-2) to quickly create a robot command set (106) without any knowledge other than how to operate the GUI (101). The user need not know the language and syntax of the robot command class.

Figure 1C:
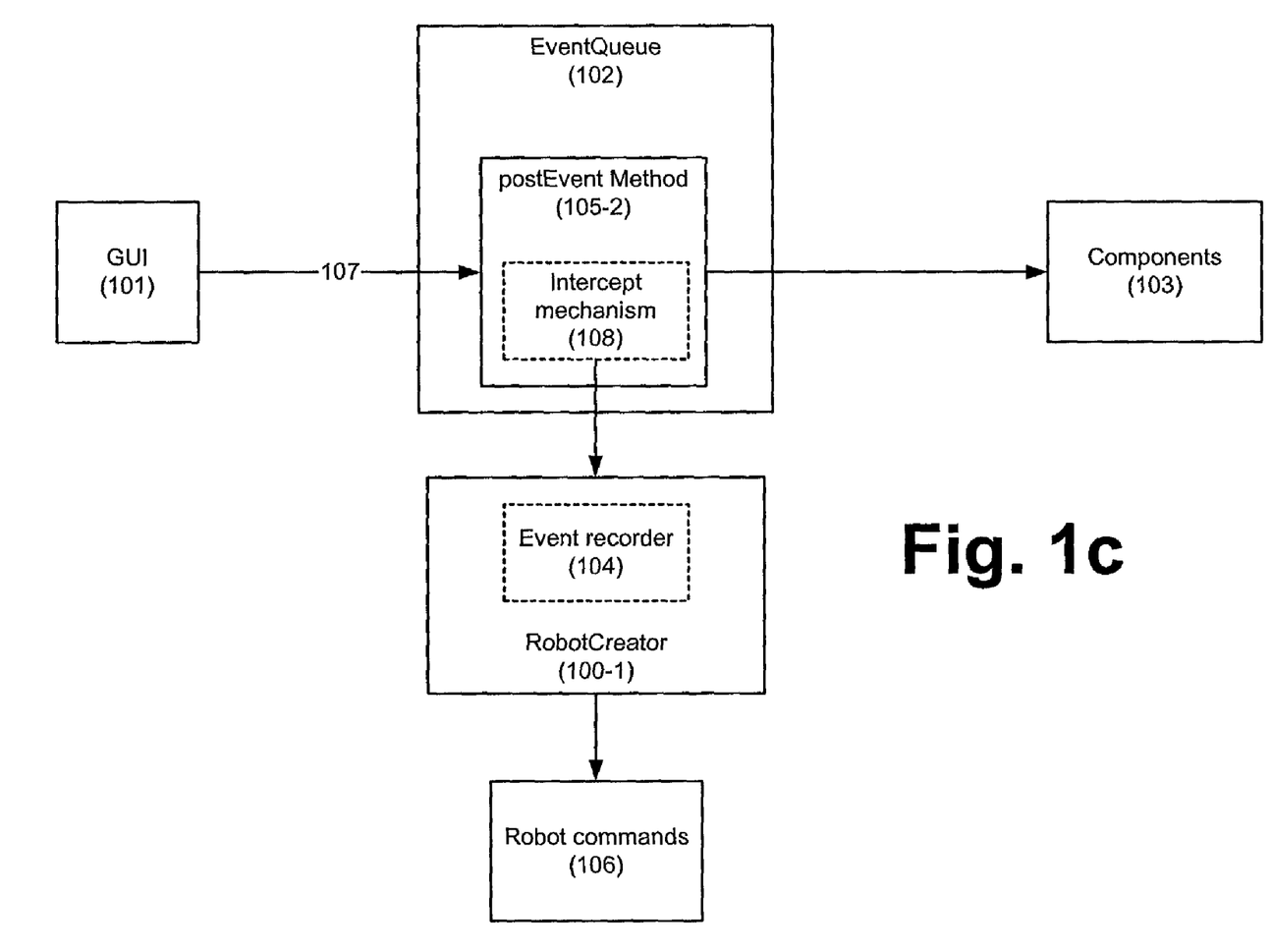
FIG. 1c is a block diagram illustrating the principal components of another alternative embodiment according to principles of the present invention in which user input to a graphical user interface is captured for automatic creation of a robot command set.

FIG. 1c illustrates still another possible embodiment of the present invention. As shown in FIG. 1c, the postEvent method (105-2) is again modified to contain an intercept mechanism (108).

As described above, the intercept mechanism (108) will intercept events as they are sent to the postEvent method (105-2). The intercept mechanism (108) then additionally sends the events to a RobotCreator (100-1) that is external to the postEvent Method (105-2).

In the present embodiment, the RobotCreator (100-1) includes an event recorder (104). The event recorder (104) can store a record of the events received from the intercept mechanism (108). Then, the RobotCreator (100-1) can periodically translate all the recorded events into a set of corresponding robot commands (106).

The RobotCreator (100-1) of this embodiment can be selectively called by the user through, for example, the GUI (101). The user can then control when the RobotCreator (100) outputs a set of robot commands based on the events in the event recorder (104).

Figure 2:
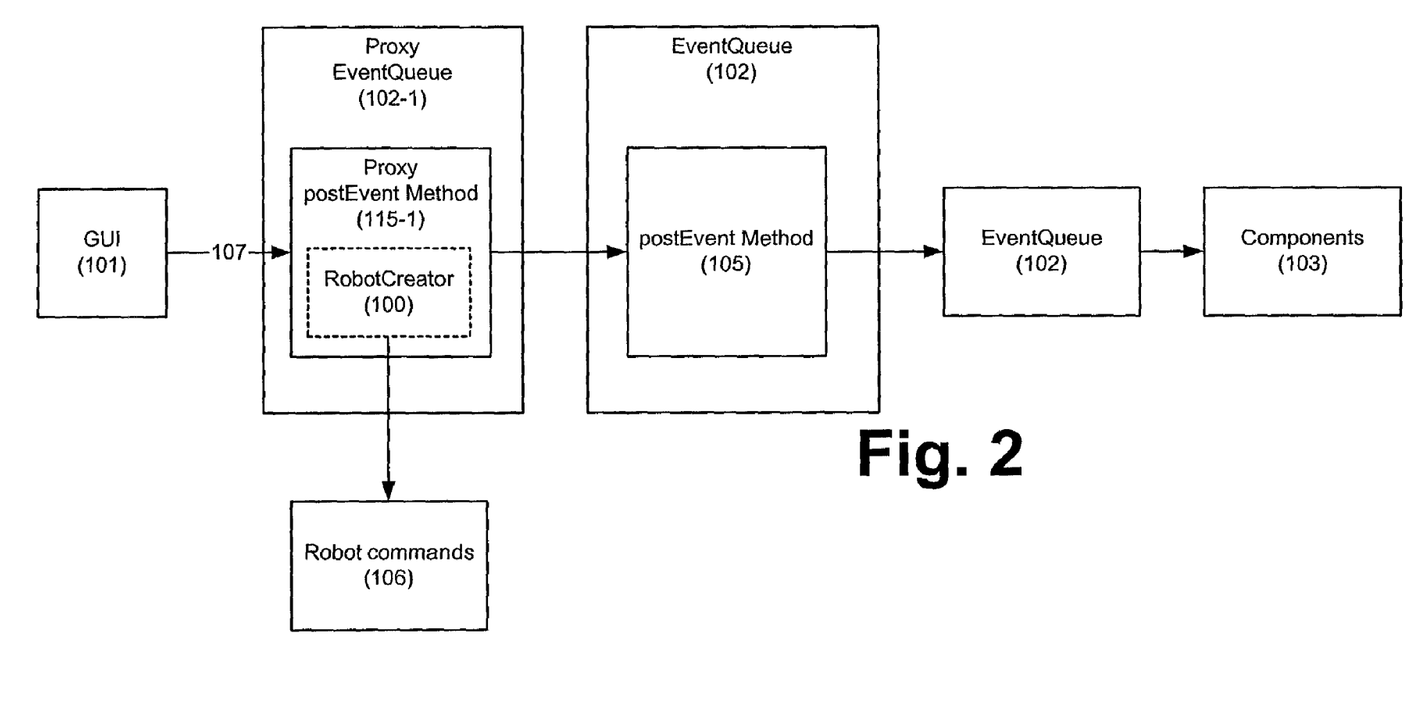
FIG. 2 is a block diagram illustrating the principal components of another alternative embodiment according to principles of the present invention in which user input to a graphical user interface is captured for automatic creation of a robot command set.

FIG. 2 illustrates another additional embodiment of the present invention. In the embodiment of FIG. 2, the postEvent method (105) that is a standard part of the event queue (102) is not modified. Rather, the present invention can be implemented by extending the java.awt.EventQueue class to include a new proxy postEvent method (115-1) prepared specifically to operate as needed by the present invention. This extension of the java.awt.EventQueue class can be considered as a proxy event queue (102-1).

The proxy postEvent method (115-1) intercepts events being provided to the event queue (102). The events are then also passed on to the main event queue (102) as they would be if the proxy event queue (102-1) were not present. In other words, the proxy postEvent method (115-1) will also pass along the event to the JRE by calling the existing postEvent method (105) in the super class.

The proxy postEvent method (115-1) preferably includes a RobotCreator (100) that generates corresponding robot commands (106) from the events intercepted by the proxy postEvent method (115-1). Alternatively, the proxy postEvent method (115-1) may instead include an intercept mechanism for passing events to a RobotCreator external to the proxy postEvent method (115-1).

Thus, the present invention may be practiced by modifying the existing EventQueue as described above, or by providing a proxy postEvent method in the java.awt.EventQueue class. The embodiment of FIG. 2 has the advantage that no modification to the existing JAVA environment is required. In either case, the functionality of the embodiments is essentially equivalent.

Figure 3:
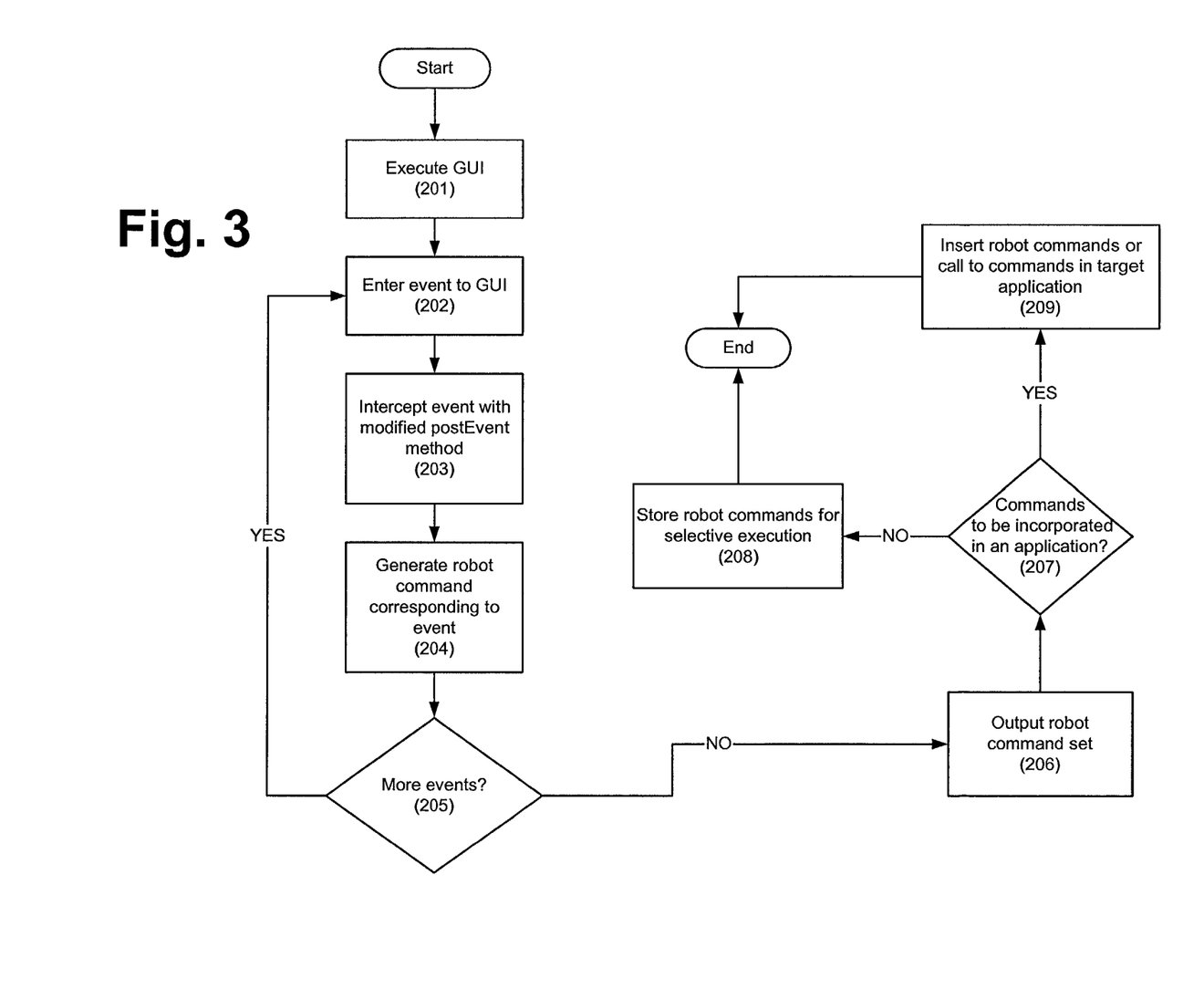
FIG. 3 is a flowchart illustrating the method underlying operation of the system illustrated in FIGS. 1a, 1b and 1c.

FIG. 3 is a flowchart illustrating the method underlying operation of the system illustrated in FIGS. 1a-1c. As shown in FIG. 3, the GUI is executed (201) to provide means for the user to enter input or events to the system. The user may then enter an event (202) using the GUI. Presumably, this is an event that the user wishes to incorporate into a set of robot commands.

The events are intercepted by a modified postEvent method (203). This modified postEvent method (203) may incorporate a RobotCreator, as in FIG. 1a, or an intercept mechanism, as in FIGS. 1b and 1c. In either case, the intercepted event is passed to a RobotCreator which generates corresponding robot commands (204). The user may then continue entering additional events (205) until all the events desired in the set of robot commands have been entered. When there are no further events to be entered (205), the completed set of robot commands is created (206).

Once the set of robot commands is generated, it can be used in a number of ways. First, the robot commands may be intended for incorporation into the present or another application or applet (207), particularly an application under development. In such a case, the robot commands, or a call to the robot commands, can be directly inserted into the target application or applet (209). This would be the case where the robot commands are to be implemented at a particular point or points in the execution of the target application or applet.

Alternatively, the robot commands may be stored separately, for example, in a separate file, so that they can be selectively called, for example, by a user through a GUI or other interface (208). This would be the case where the robot commands may be needed periodically by the user, but are not necessarily to be implemented at a particular point or points in the execution of an application or applet.

Figure 4:
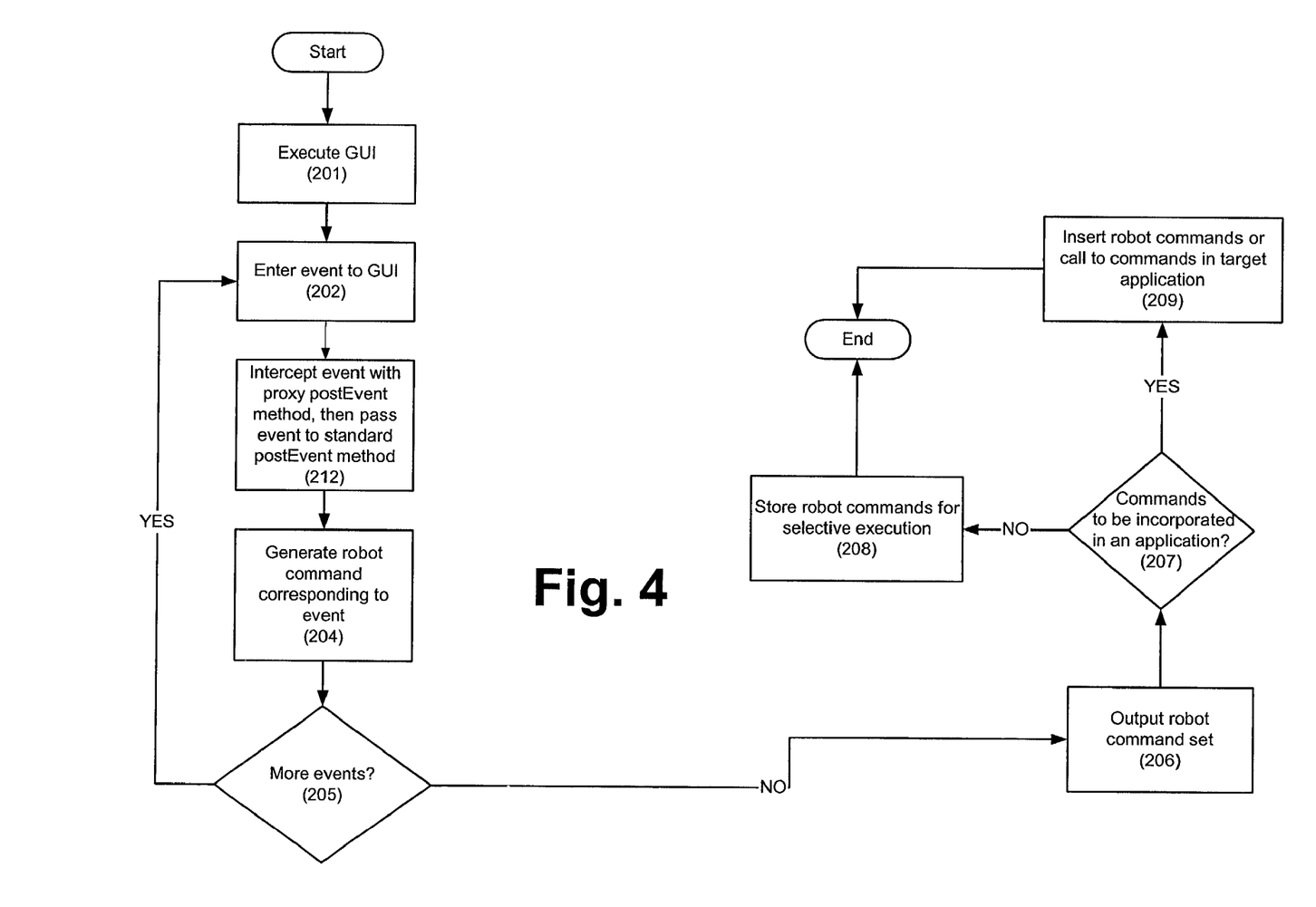
FIG. 4 is a flowchart illustrating the method underlying operation of the system illustrated in FIG. 2.

FIG. 4 is a flowchart illustrating the method underlying operation of the system illustrated in FIG. 2. As shown in FIG. 4, the GUI is executed (201) to provide means for the user to enter input or events to the system. The user may then enter an event (202) using the GUI. Presumably, this is an event that the user wishes to incorporate into a set of robot commands.

The events are intercepted by a proxy postEvent method (212). The proxy postEvent method also passes the event to the standard postEvent method (212) so that the event is received as if the proxy postEvent method had not intercepted it.

The proxy postEvent method may incorporate a RobotCreator, as in FIG. 2, or an intercept mechanism that transfers events to a RobotCreator. In either case, the intercepted event is passed to a RobotCreator which generates corresponding robot commands (204). The user may then continue entering additional events (205) until all the events desired in the set of robot commands have been entered. When there are no further events to be entered (205), the completed set of robot commands is created (206).

As before, once the set of robot commands is generated, it can be used in a number of ways. First, the robot commands may be intended for incorporation into the present or another application or applet (207), particularly an application under development. In such as case, the robot commands, or a call to the robot commands, can be directly inserted into the target application or applet (209). This would be the case where the robot commands are to be implemented at a particular point or points in the execution of the target application or applet.

Alternatively, the robot commands may be stored separately, for example, in a separate file, so that they can be selectively called, for example, by a user through a GUI or other interface (208). This would be the case where the robot commands may be needed periodically by the user, but are not necessarily to be implemented at a particular point or points in the execution of an application or applet.

Further details regarding implementations of the present invention will now be discussed. As indicated above, the robot commands are preferably java.awt.Robot commands in the JAVA language. Robot is a class that was added to JAVA in JDK 1.3. Specifically, Robot allows the keyboard and mouse to be controlled in order to generate events.

To enable the Robot class on a particular workstation, it may be necessary to install and enable XTEST version 2.2. For example, on the HP-UX workstation by Hewlett-Packard Co., XTEST is enabled by holding down the "F12" key until the configuration screen comes up. XTEST can then be enabled on the configuration screen. In the Exceed platform by HummingBird, XTEST 2.2 is available, but not enabled by default. To enable use of the Robot class with Exceed, it is necessary to enable the XTEST extension by going into XConfig, going into the Protocols section, clicking the Extensions button, and checking "XTEST(X11R6)".

Also, for applets, to enable the use of robot command sets, it is necessary to add a couple of properties to your ~/.java.policy file. The lines to add may be coded as follows:

grant {permission java.awt.AWTPermission "createRobot"; };
grant {permission java.awt.AWTPermission "readDisplayPixels"; };
grant {permission java.io.FilePermission "<<ALL FILES>>", "read, write, delete"; };

The FilePermission is necessary so that screen captures can be written out to disk and so that a results file can be written.

As indicated above, in one embodiment of the present invention, the java.awt.EventQueue class is modified to allow events to be intercepted as they are put into the event queue. This is the modified postEvent method described above. This method preferably does some initialization and writes the appropriate header information to a text file recording the robot commands.

If the RobotCreator Tool is running in a separate window or frame, the user can indicate that events in that frame are to be ignored. This allows the user to operate the RobotCreater interface while not having those event converted into Robot commands. The method sets a flag indicating that recording has begun. This flag is what initiates the interception of events by the modified postEvent method.

Once recording has begun, the postEvent method is called whenever an event is entered into the GUI. The event may be, for example, a MouseEvent, KeyEvent, or WindowEvent. The RobotCreator then looks at the event and converts it into the appropriate Robot command(s), if possible.

Also, if the GUI from which events are being recorded is, or is part of, an application, then the postEvent method will attempt to determine the main frame of the application. This is done by taking the source of an event, getting the parent of that component, and then the parent of that component, until there is no further parent to identify. If the topmost ancestor is not the frame for which recording is ignored (i.e., the RobotCreater frame), then that ancestor is designated as the main frame. Once the main frame is set, further events need not be checked in this way. All of this is done so that the application can be closed after the recording of events is completed and the resulting set of robot commands can be run under the RobotCreater interface. The user should make sure all other windows are closed before stopping the recording.

The operation of the modified or proxy postEvent method will now be described in more detail. Once it is determined that an event should be converted into a Robot command, how this conversion takes place depends on the type of event and the options that are set. KeyEvents are converted into Robot commands by simply getting the key code of each key that was pressed.

The way MouseEvents are handled depends on a few options. If the robot command set is being automated for use with an applet and the source code is available for the applet, then mouse movements are preferably converted into robot commands that are relative to the applet's upper left corner on the screen. The location of the applet on the screen is determined at the beginning of the generation of the robot command set. Therefore, the applet should not be moved around during this process.

If the robot command set is being generated from operation of an application for which source code is available or any application or applet for which source code is not available, the mouse movements will be recorded as absolute coordinates. The reason this is done in particular for applications is because it is much more likely in running an application that additional windows will be displayed. This cannot be handled easily since there would need to be a reference to each window that is displayed when the robot commands are being executed since the location of the window on the screen must be known in order to make the movements relative. The setLocation method of frames, windows, and dialogs can be used to make sure the mouse movements appear in the same place on the screen no matter where they are run.

If the application or applet in which events are being recorded for conversion to robot commands consists of Swing components, then KeyEvents and MouseEvents are the only events that need to be converted into Robot commands. This is possible because KeyEvents and MouseEvents can cause almost every other important event.

However, if the application or applet in which events are being recorded for conversion to robot commands consists of Abstract Windows Toolkit (AWT) components, then there are certain components of the GUI that do not produce KeyEvents and MouseEvents. Some examples are Choices, ScrollBars, MenuItems, and FileDialogs. When these components are used, KeyEvents and MouseEvents are not generated. Therefore, an alternative means of generating corresponding robot commands is needed in these situations. Alternatives for these situations may be dependent on whether the source code is available. Some of the possible alternatives for these situations will be outlined below.

Choices: When a Choice is clicked on in an AWT GUT, any actions that occur subsequently are not propagated as JAVA events. However, once an item is selected, an ItemEvent occurs. In such a case, instead of using Robot, it may be preferably to change the state of the Choice. The select method of the Choice is used to select the appropriate item and then an ItemEvent is posted into the queue. If there is only one Choice component as an instance variable in the application or applet, then Reflection can be used to determine what the name of that Choice component is. However, if there are no Choice instance variables, if there is more than one Choice instance variable, or if the Choice instance variables are not visible or accessible, then in the generated robot commands the RobotCreator may place a dummy variable called, for example, "choiceReplaceMe" that is then replaced with the appropriate Choice instance.

ScrollBars: AWT ScrollBars do not produce mouse events when they are clicked on or dragged. Consequently, the handling of such a situation is similar to the one used for Choice components. The setValue method is called on the ScrollBar instance, and then an AdjustmentEvent is posted into the queue. The same considerations that apply for Choice components in regards to the number of instances and visibility apply to ScrollBars as well. The dummy variable that might need replacing is, for example, "scrollReplaceMe".

MenuItems; MenuItems also do not produce mouse or key events, but they do produce ActionEvents. These are used in the same way as ItemEvents are used for Choices and AdjustmentEvents are used for ScrollBars. The same considerations apply and since multiple menu items are very likely, it will likely be necessary to replace a dummy variable, for example, "menuCompReplaceMe," with the appropriate instance.

FileDialogs: FileDialogs do not produce any events from which commands could be generated. Therefore, when a FileDialog is displayed, a comment can be placed in the Robot command file indicating where any necessary actions should be placed. These actions could be Robot actions or something else.

Screen Captures: The RobotCreator was initially conceived and implemented to automate Java GUI testing. Screen capture and comparison are additional features that can be useful where the goal of the application is testing a Java GUI application.

Using RobotCreater, the user can preferably indicate at which points in the playback of a set of robot commands that screen captures should be taken. If the user is working with an application, once it is indicated that a screen capture should occur, then the first window that is activated (other than the RobotCreater window) will be the one where the screen capture is performed. If the user is automating an applet, then once the user moves the mouse back into the applet, the screen capture will be triggered. Screen captures are provided as a means for validating proper execution of an application or applet. Once a sequence of robot commands has been generated that appropriately exercise the application or applet under test, the screen captures can be used to verify that changes to either the application or applet itself, or the Java Virtual Machine and related libraries, do not cause the application or applet to work incorrectly.

Note that screen captures are not done when events are being recorded. Rather, screen captures are only done when the robot commands are being played back. The results of screen captures can preferably be viewed in a file starting with, for example, the name "result-" in the same directory as the class file.

Note that screen captures may differ when the robot command set is run on different machines due to subtle differences in X server configuration or fonts. Thus, when a robot command set is being generated, the work should preferably be done on the machine where the robot command set will be run. Alternately, the user can create a robot command set and then create a copy of the directory containing the command set. Another option is to set the display system property or parameter to make the screen captures specific to a certain display.

If the user removes the "exp" directory, then the expected results will be saved the next time the test is run. Make sure that these expected results really are the correct results. If at all possible, you should determine if there is a way to validate the test based on something other than screen captures. This could consist of checking to see whether the right component has the focus or whether a component has the right text in it. These alternate methods of validation cannot be done through the RobotCreater interface. They must be done by hand by editing the source code.

Once a user indicates recording should be halted, the flag is turned off so that no more events will be converted into Robot commands. Various other shutdown operations occur.

Further details of the RobotCreater tool will now be discussed. For example, RobotCreater is preferably a Swing application/applet that uses a CardLayout to enable it to present different options without creating any new windows. This is so that events within the RobotCreater tool can be ignored.

As indicated above, RobotCreater can be used to automatically insert robot commands that have been generated into an application or applet. This may be done if the present invention is being used to automate GUI testing. If the source code is available for the application or applet into which the robot commands will be inserted, the robot commands can be inserted by an insertion algorthim of the RobotCreater tool. Outlined below are the different things that the insertion algorithm will look for:

AWT application: With an AWT application, the insertion algorithm will look for a main method, and within that main method, for an instance of the class into which the robot commands are being inserted. If an instance is found, then a call to the runRobotTest instance method of that class is inserted at the end of the main method. This runRobotTest method will also be inserted after the main method. If one is not found, then this will be signaled and the insertion will have to be done manually.

Swing application: With a Swing application, the insertion algorithm will look for a main method, and will insert the call to runRobotTest at the end of it, and also the actual code for the runRobotTest method after main.

AWT/Swing applet: With an AWT/Swing applet, the insertion application will look for the start method, and will insert the call to runRobotTest at the end of it. The code for the runRobotTest method will appear after the start method. If the end of the class is reached without finding a start method, then one will be added to the class along with the runRobotTest method.

Once the insertion is done, the class is compiled just by calling the main method of sun.tools.javac.Main and passing in the appropriate arguments. If the source was not available, the generated Robot commands are in a standalone class. This also can be compiled.

Once the class is compiled, the necessary steps to load the new version of the class file differs for applications and applets. For applications, a new ClassLoader is defined that will always read the class from the disk, even if it had been loaded already. The main method of the class is then invoked in the same way it was when it was started the first time. For applets, to force the applet to be reloaded, the RobotCreater applet sends the browser to a different web page which then redirects, via JavaScript, the browser back to the page containing the applets. The JavaScript is different for Netscape 4 and Netscape 6. For Netscape 6, it must obtain additional priveleges from the browser in order to work. Another issue is that if the browser is started from within the directory that contains the class files, then this method will not work. The only thing that will work is closing the browser completely and then running it again.

The present invention can be used in a wide variety of applications. For example, as noted above, the present invention can be used to generate a set of Robot Commands that are used to test the operation of a GUI application. Other applications including preparing demos or interactive tutorials of the operation of an application.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A workstation comprising a system for generating a set of robot commands based on user entry events in a user interface, said system comprising:
   a Java language operating environment comprising a java.awt.Robot class that provides robot commands that correspond to particular user input events;
   an event queue to which said events are sent from said user interface; and
   a RobotCreator tool for receiving said events as those events are submitted to said event queue, wherein said RobotCreator tool converts said events into robot commands using said java.awt.Robot class;
   wherein said robot commands ten form a macro which can substitute for user input events made using said user interface during execution of an application.

2. The workstation of claim 1, wherein said event queue comprises a postEvent method for receiving said events and submitting said events to said RobotCreator tool.

3. The workstation of claim 2, wherein said postEvent method is a modified version of a standard postEvent method that is part of a java.awt.EventQueue class.

4. The workstation of claim 2, wherein said postEvent method comprises a proxy postEvent method for submitting said events to said RobotCreator tool and passing said events to a standard postEvent method.

5. The workstation of claim 1, wherein said user interface is a graphical user interface.

6. The workstation of claim 1, wherein said user interface is a component of an application.

7. The workstation of claim 1, wherein said user interface is a component of an applet.

8. The workstation of claim 2, wherein said postEvent method comprises an intercept mechanism for submitting said events to said RobotCreator tool which is external to said postEvent method.

9. The workstation of claim 1, wherein said RobotCreator tool further comprises:
   an event recorder for receiving events submitted to said event queue; and
   means for receiving a record of events from said event recorder and convening said received events into robot commands.

10. The workstation of claim 1, wherein said RobotCreator further comprises an insertion algorithm, wherein said insertion algorithm is configured to search for a point in an application or applet at which said robot commands or a call to said robot commands is to be inserted.

11. A method of generating a set of robot commands based on user entry events in a user interface in a Java language operating environment comprising a robot class that provides robot commands that correspond to particular user input events, said method comprising:
   receiving said events with a RobotCreator tool as those events are submitted to an event queue; and
   converting said events into robot commands using said robot class with said RobotCreator tool;
   wherein said robot commands then form a macro which can substitute for user input events made using said user interface during execution of an application.

12. The method of claim 11, further comprising receiving said events and submitting said events to said RobotCreator tool with a postEvent method of said event queue.

13. The method of claim 12, further comprising modifying a standard postEvent method that is part of a java.awt.EventQueue class to intercept said events and submit those events to said RobotCreator tool.

14. The method of claim 12, further comprising providing a proxy postEvent method for submitting said events to said RobotCreator tool and passing said events to a standard postEvent method.

15. The method of claim 11, wherein said user interface is a graphical user interface.

16. The method of claim 11, further comprising making said user entry events into said user interface which is a component of an application.

17. The method of claim 11, further comprising making said user entry events into said user interface which is a component of an applet.

18. The method of claim 11, further comprising:
intercepting said events with an intercept mechanism in said postEvent method; and
submitting said events to said RobotCreator tool which is external to said postEvent method.

19. The method of claim 11, wherein said converting said events further comprises receiving events submitted to said event queue with an event recorder of said RobotCreator tool; and
converting said received events into robot commands with said RobotCreator tool.

20. The method of claim 11, further comprising searching for a point in an application or applet at which said robot commands or a call to said robot commands is to be inserted.

21. A method of generating a set of robot commands based on user entry events in a user interface in a Java language operating environment comprising a java.awt.Robot class that provides robot commands that correspond to particular user input events, said method comprising:
intercepting said events as those events are submitted to an event queue; and
converting said events into robot commands using said java.awt.Robot class;
wherein said robot commands then form a macro which can substitute for user input events made using said user interface during execution of an application.

22. The method of claim 21, wherein:
said intercepting is performed by a postEvent method of said event queue; and
said converting said events is performed with a RobotCreator tool.

23. A software tool, stored on a medium for storing software, said tool, when executed in a Java language operating environment comprising a java.awt.Robot class that provides robot commands that correspond to particular user input events, causing generation of a set of robot commands based on user entry events in a user interface by:
receiving said events as those events are submitted to an event queue; and
converting said events into robot commands using said java.awt.Robot class;
wherein said robot commands then form a macro which can substitute for user input events made using said user interface during execution of an application.

24. A workstation comprising a system for generating a set of robot commands based on user entry events in a user interface, said system comprising:
an operating environment comprising a Robot class that provides robot commands that correspond to particular user input events;
a RobotCreator tool for intercepting said events as those events are submitted to an event queue and for converting said events into robot commands using said Robot class;
wherein said robot commands then form a macro which can substitute for user input events made using said user interface during execution of an application.

25. The workstation of claim 11, further comprising generating said robot commands using a java.awt.Robot class.

* * * * *

UNITED STATES PATENT AND TRADEMARK OFFICE
CERTIFICATE OF CORRECTION

PATENT NO. : 7,437,715 B2
APPLICATION NO. : 10/119618
DATED : October 14, 2008
INVENTOR(S) : Kit Chatsinchai et al.

Page 1 of 1

It is certified that error appears in the above-identified patent and that said Letters Patent is hereby corrected as shown below:

In column 1, lines 6-7, delete "A System and Method for Generating a Set of Robot Commands Based on User Entry Events in a User Interface".

In column 7, line 27, delete "GUT" and insert -- GUI --, therefor.

In column 10, line 3, in Claim 1, delete "ten" and insert -- then --, therefor.

In column 10, line 32, in Claim 9, delete "convening" and insert -- converting --, therefor.

Signed and Sealed this

Seventeenth Day of March, 2009

JOHN DOLL
*Acting Director of the United States Patent and Trademark Office*